United States Patent
Parker et al.

[15] 3,697,542
[45] Oct. 10, 1972

[54] METHOD OF PRODUCING α-CARBOXYLATED 5-MEMBERED LACTONES

[72] Inventors: William L. Parker, North Brunswick, N.J.; Francis Johnson, Newton Lower Falls; John Martin, Framingham, both of Mass.

[73] Assignee: The Dow Chemical Company, Midland, Mich.

[22] Filed: Nov. 10, 1969

[21] Appl. No.: 875,520

[52] U.S. Cl. ....... 260/326.3, 260/247.2 B, 260/343.3, 260/343.6
[51] Int. Cl. ......... C07d 27/28, C07d 5/06, C07d 5/46
[58] Field of Search .............. 260/343.6, 326.3, 343.3

[56] References Cited

OTHER PUBLICATIONS

Herman L. Finkbeiner et al. Chelation as a Driving Force in Organic Reactors, J. A.C.S. Vol. 85 616 (1963).

*Primary Examiner*—Alex Mazel
*Assistant Examiner*—Anne Marie T. Tighe
*Attorney*—Griswold & Burdick and C. E. Rehberg

[57] ABSTRACT

Five-membered lactones are α-carboxylated by reacting in solution the lactone with methyl methoxy-magnesium carbonate. The lactone reactants are restricted to those having an α-methylene group.

9 Claims, No Drawings

METHOD OF PRODUCING α-CARBOXYLATED 5-MEMBERED LACTONES

BACKGROUND OF THE INVENTION

Previously, α-carboxylactones were produced in multi-step processes. Illustrative is the process comprising saponification of the corresponding α-carbalkoxylactone followed by acidification and relactonization of the hydroxy-diacid thus produced. See E. E. van Tamelen et al., Journal of the Americal Chemical Society (J.A.C.S.). 77, 4683 (1955); and J.A.C.S., 80, 3079 (1958).

Generally, the α-carboxylactones are useful as chemical intermediates for the preparation of the corresponding α-methylenelactones; the α-methylenelactones having known utility as fungicides and as antibiotics. See Jones et al., J. Chem. Soc., 230 (1955); and Brookes et al., J. Chem. Soc. 5385 (1963).

SUMMARY OF THE INVENTION

It has now been discovered the α-carboxylated 5-membered lactones, i.e., γ-butyrolactones, are produced in the novel process comprising reacting in solution a 5-membered lactone having an α-methylene group with "methyl methoxymagnesium carbonate," i.e., Stiles Reagent (J.A.C.S., 85, 616 (1963)).

The initial product of the subject process is a chelate formed between the magnesium ion and the desired α-carboxylactone. It is therefore necessary to acidify the reaction mixture after the chelate is formed to obtain the free α-carboxylactone.

Suitable lactone reactants in the subject process may be represented by the structural formula (I)
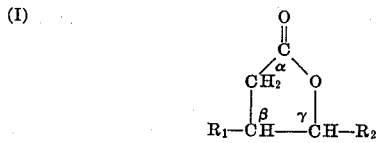

wherein $R_1$ and $R_2$ are hydrogen or an inert organic group. By inert, we mean inert in the process. Suitable lactone reactants include those of formula I wherein $R_1$ and $R_2$ are hydrogen, or organic groups having up to about 25 carbon atoms, said groups being alkyl, aryl, alkaryl, aralkyl, alkoxy, aryloxy, cycloalkyl, five and six-membered heterocyclicalkyl wherein the hetero atom is oxygen or nitrogen, or a hydrocarbon whose chain length is interrupted with a keto, ester or carboxamide group, or $R_1$ and $R_2$ are joined to form a five or six-membered cycloaliphatic group, a heterocyclic alkyl group wherein the hetero atom is oxygen or nitrogen, or a five-membered lactone group, and other like compounds. Preferred reactants are those wherein $R_1$ is hydrogen and $R_2$ is hydrogen or an organic group of one to about 15 carbon atoms or $R_1$ is joined with $R_2$ to form a five or six-membered cycloaliphatic group, a heterocyclicalkyl group wherein the hetero atom is oxygen or nitrogen, or a five-membered lactone group. The most preferred reactants are those wherein (a) $R_1$ is hydrogen and $R_2$ is hydrogen or an alkyl group of one to about 10 carbon atoms, (b) $R_1$ is joined with $R_2$ to form a five-membered lactone, or (c) $R_1$ is hydrogen and $R_2$ is

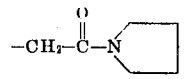

Examples of suitable lactone reactants include those set forth in Table I.

TABLE I

| $R_1$ | $R_2$ |
|---|---|
| H | H |
| H | methyl |
| butyl | methyl |
| H | n- or iso-propyl |
| H | cyclohexyl |
| H | n-octyl |
| H | n-dodecyl |
| n-butyl | H |
| n-decyl | H |
| H | phenyl |
| H | tolyl |
| H | xylyl |
| H | benzyl |
| H | 2-phenethyl |
| ethoxy | H |
| H | butoxy |
| H | OC$_6$H$_5$ |
| N-morpholino | H |
| H | CH$_2$CH$_2$—C(=O)—CH$_3$ |
| H | CH$_2$CH$_2$C(=O)—OC$_2$H$_5$ |
| H | n—C$_3$H$_6$—C(=O)—NH$_2$ |
| H | —C$_4$H$_8$—N(CH$_3$)$_2$ |
| H | —CH$_2$—C(=O)—N⟩ | and compounds wherein $R_1$ and $R_2$ are joined to form fused rings, such as

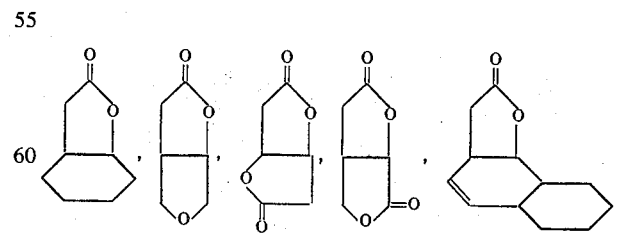

and other like compounds.

The methyl methoxymagnesium carbonate or Stiles reagent may be prepared by any known convenient method but is advantageously prepared by the method described by H. L. Finkbeiner and M. Stiles, J.A.C.S., 85, 616 (1963).

The reaction is preferably conducted in solution. Any inert organic liquid solvent is suitable, such as cyclic and straight-chain aliphatic ethers, and more polar solvents, such as N,N-dimethyl formamide, and the like. Examples of suitable solvents include ethyl ether, tetrahydrofuran (THF), N,N-dimethyl formamide (DMF), dimethylsulfoxide, and hexamethylphosphoramide and other like compounds and mixtures thereof. DMF is the preferred solvent.

The reaction requires at least one mole of methyl methoxymagnesium carbonate per mole of lactone, and a molar excess of carbonate reactant is preferred, such as about 4 or 5 moles of carbonate per mole of lactone. At a reactant molar ratio above about 5, little advantage is realized, and when the molar ratio is less than 1, the product yield is lowered.

The reaction temperature is suitably between about 60°C. and about 200°C., and is preferably between about 100°C. and about 150°C. The reaction temperature is typically and conveniently governed by the boiling point of the chosen solvent.

The reaction pressure is not critical and atmospheric, superatmospheric or subatmospheric pressures can be suitably used. Atmospheric pressure, or pressures slightly above, are convenient and therefore preferred.

The reaction rate varies in a direct manner with the reaction temperature, and in an inverse manner with the size or bulk of the $R_1$ and $R_2$ substituents, particularly with the $R_1$ substituent, due to steric effects. Generally, a suitable reaction time is between about 1 and about 24 hours and is preferably between about 5 to about 8 hours under the preferred conditions of temperature, etc.

To maximize product yields, it is important to conduct the reaction under substantially anhydrous conditions since water attacks and deactivates the carbonate reactant. It is also advantageous to conduct the reaction under an inert atmosphere, such as dry nitrogen, and, it is seemingly important to remove the methanol from the reaction mixture essentially as it is formed since methanol substantially reduces the reaction rate. In practice, a dry inert gas is merely passed through the reaction mixture to (1) establish a dry, inert atmosphere and (2) remove the methanol; or, the reaction is conducted under reduced pressure at a temperature such that the methanol is removed. Other equivalent and obvious methods, however, may be used.

Preparation of Standard Methyl Methoxymagnesium Carbonate (MMC) Solution

A solution of MMC in dimethyl formamide (DMF) was prepared in accordance to the procedure described by Finkbeiner and Stiles, J.A.C.S., 85, page 621 (1963), wherein 480 g. of magnesium turnings was added slowly to 8 l. of dry methanol over a 16 hour period. After the magnesium was completely reacted, the excess methanol was removed under reduced pressure. DMF was added to give a volume of 10 l. and gaseous carbon dioxide was added to the stirred solution as rapidly as it was dissolved. After the solid had dissolved, any residual methanol was distilled under a slow stream of $CO_2$ at an elevated temperature. The solution was cooled to room temperature and stirred under $CO_2$ for 1–3 hours.

Example 1. The preparation of α-Carboxy-γ-Phenylbutyrolactone

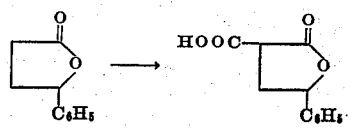

γ-Phenylbutyrolactone (5.0 g.) was mixed with 45 ml. of the above standard solution of MMC. The mixture was heated at 140°C. for 6 hours with a continuous stream of dry nitrogen passing through the reaction mixture. 6N HCl was then added with agitation until the precipitate dissolved. The reaction mixture was then extracted 4 times with 100 ml. portions of ethyl ether. The extracts were combined, washed with saturated aqueous sodium bicarbonate, the aqueous phase was acidified with HCl, extracted with ether and the ether solution separated, washed with water, and dried over magnesium sulfate. The drying agent was filtered off, the ether removed at 40°C. under reduced pressure, and the pale yellow oil residue was crystallized by triturating same with carbon tetrachloride. The product was a cis-trans mixture which was resolved by crystallization from a 50-50, volume basis, petroleum ether (b.p. 50–60°C.)-ethyl ether solvent mixture. The chemical structure of the cis isomer, which was the major product, was confirmed by nuclear magnetic resonance (NMR) and elemental analysis. Melting point: 103–104°C.

TABLE II

|  | %C | %H |
|---|---|---|
| Calc. | 60.39 | 7.43 |
| Found | 60.57 | 7.58 |

Example 2. The Preparation of α-Carboxy-β-(1-Hydroxynonyl)-δ-Oxo-1-Pyrrolidinevaleric Acid γ-Lactone

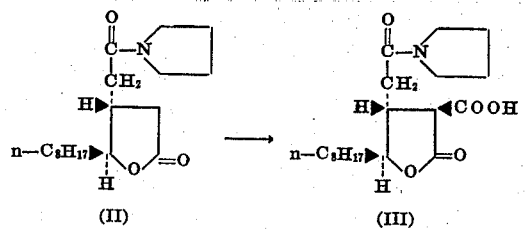

A sample of II (1.0 g.) was mixed with 5.0 ml. of the above standard solution of MMC. The reaction mixture was heated at 130°C. for 26 hours with a continuous stream of dry nitrogen passing through the reaction mixture. The product was isolated using an identical workup procedure as in Example 1. The chemical structure of the product was confirmed by NMR and infrared (IR) and elemental analysis. Melting point: 92–95°C.; Product yield: 85 percent.

TABLE III

|  | %C | %H | %N |
|---|---|---|---|
| Calc. | 64.56 | 8.84 | 3.96 |
| Found | 64.12 | 8.90 | 4.25 |

Methylation of III using diazomethane gave the corresponding methyl ester. The ester was identical with a sample prepared via a different route, i.e., by carboxymethylation of II using sodium hydride and dimethyl carbonate containing a trace of methanol.

Example 3. The Preparation of α-Carboxylated 2-Hydroxy-3-(1-Hydroxynonyl)Glutaric Acid di-γ-Lactone

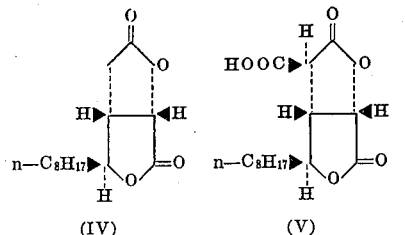

A sample of IV (2.77 g., 10.9 mmol) was mixed with 22 ml. of the above standard solution of MMC. The reaction mixture was heated at 120°C. for 5 hours with a continuous stream of dry nitrogen passing through the reaction mixture. The solution was poured into a mixture of ethyl ether (100 ml.) and 6N HCl (100 ml.). The mixture was shaken until the precipitate dissolved. The ether phase was separated, washed 4 times with water, washed once with a saturated aqueous NaCl solution, dried over $MgSO_4$, and then concentrated to an oil under reduced pressure. The oil crystallized upon standing. The product was recrystallized from a hexane-ethyl ether mixture. Weight: 2.43 g. (75 percent yield); melting point: 78–80°C. The chemical structure of the product was confirmed by NMR, IR and elemental analysis.

TABLE IV

|  | %C | %H |
|---|---|---|
| Calc. | 60.39 | 7.43 |
| Found | 60.57 | 7.58 |

Example 4. The Preparation of (2-Hydroxyoctyl)Malonic Acid γ-Lactone

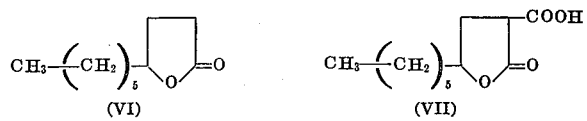

A sample of VI (2.0 g., 11.75 mmoles) was mixed with 20 ml. of the above standard solution of MMC. The reaction mixture was heated at 140°C. for 6 hours with a continuous stream of dry nitrogen passing through the reaction mixture. The product was isolated in a procedure substantially the same as detailed in Example 1. The crude product from the ether extracts was a yellow oil (2.47 g.) which was redissolved in ethyl ether and petroleum ether was added until the product came out of solution as a white solid. The product was recrystallized in ethyl ether and petroleum ether as above. The product structure was confirmed by IR, NMR and elemental analysis. Melting point 60.5°–61.5 °C.; product yield: 98 percent.

TABLE V

|  | %C | %H |
|---|---|---|
| Calc. | 61.66 | 8.47 |
| Found | 61.56 | 8.73 |

(2-Hydroxyhexyl)malonic acid γ-lactone was prepared from

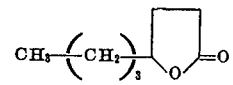

in a similar manner.

We claim:
1. A process for producing an α-carboxylated γ-butyrolactone comprising reacting by contacting in solution (a) a γ-butyrolactone having two hydrogen atoms on the α-carbon, with (b) methyl methoxymagnesium carbonate; said process being conducted at a reaction temperature of from about 60°C. to about 200°C.
2. The process defined in claim 1 wherein the γ-carbon atom of (a) bears an alkyl substituent of from one to 10 carbon atoms.
3. The process defined in claim 1 wherein (a) is γ-butyrolactone.
4. The process defined in claim 1 wherein (a) has the formula

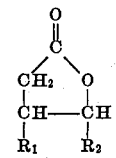

wherein $R_1$ and $R_2$ are joined to form a five-membered lactone ring.
5. The process defined in claim 1 wherein (a) is

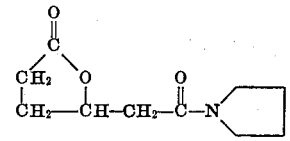

6. The process defined in claim 1 wherein the temperature is between about 100°C. and about 150°C. and the molar ratio of (b):(a) is at least 1.
7. The process defined in claim 6 wherein said molar ratio is between 1 and 5, and wherein the reaction is conducted in dimethyl formamide.
8. The process defined in claim 7 wherein the reaction is conducted in dimethyl formamide.
9. The process defined in claim 7 wherein (a) is γ-butyrolactone or a γ-butyrolactone of the formula

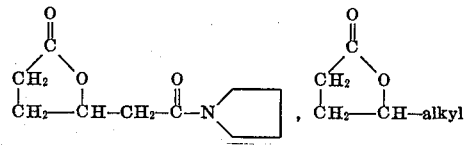

wherein said alkyl group has from one to 10 carbon atoms, or

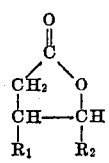

wherein $R_1$ and $R_2$ are joined to form a five-membered lactone ring.

* * * * *